(12) United States Patent
Crawford

(10) Patent No.: US 10,362,517 B2
(45) Date of Patent: Jul. 23, 2019

(54) DISTRIBUTED HANDOFF-RELATED PROCESSING FOR WIRELESS NETWORKS

(71) Applicant: Vapor IO Inc., Austin, TX (US)

(72) Inventor: Colton Malone Crawford, Austin, TX (US)

(73) Assignee: Vapor IO Inc., Austin, TX (US)

( * ) Notice: Subject to any disclaimer, the term of this patent is extended or adjusted under 35 U.S.C. 154(b) by 55 days.

(21) Appl. No.: 15/882,484

(22) Filed: Jan. 29, 2018

(65) Prior Publication Data

US 2018/0295546 A1 Oct. 11, 2018

Related U.S. Application Data

(60) Provisional application No. 62/482,835, filed on Apr. 7, 2017.

(51) Int. Cl.
| | |
|---|---|
| *H04W 36/00* | (2009.01) |
| *H04L 29/08* | (2006.01) |
| *H04L 9/06* | (2006.01) |
| *G06F 16/27* | (2019.01) |
| *H04L 9/32* | (2006.01) |
| *H04L 29/14* | (2006.01) |

(52) U.S. Cl.
CPC ........ *H04W 36/0083* (2013.01); *G06F 16/27* (2019.01); *H04L 9/0643* (2013.01); *H04L 9/3236* (2013.01); *H04L 67/10* (2013.01); *H04L 67/104* (2013.01); *H04L 67/1065* (2013.01); *H04L 67/12* (2013.01); *H04L 67/146* (2013.01); *H04L 67/148* (2013.01); *H04L 67/18* (2013.01); *H04L 69/40* (2013.01); *H04L 2209/38* (2013.01); *H04L 2209/80* (2013.01)

(58) Field of Classification Search
CPC .................................................. H04W 36/0083
USPC ........................................................ 370/331
See application file for complete search history.

(56) References Cited

U.S. PATENT DOCUMENTS

| | | | |
|---|---|---|---|
| 2007/0076738 A1* | 4/2007 | Ludwig | .................... H04L 41/12 370/431 |
| 2011/0170455 A1* | 7/2011 | Cai | ...................... H04L 12/1403 370/259 |
| 2011/0320520 A1 | 12/2011 | Jain | |
| 2012/0184244 A1* | 7/2012 | Cai | .......................... H04L 12/14 455/408 |
| 2014/0007236 A1 | 1/2014 | Krueger et al. | |
| 2014/0244847 A1 | 8/2014 | Pouyllau et al. | |
| 2017/0033924 A1 | 2/2017 | Jain et al. | |
| 2017/0236123 A1 | 8/2017 | Ali et al. | |
| 2017/0279801 A1 | 9/2017 | Andrade | |
| 2017/0332420 A1 | 11/2017 | Cui et al. | |
| 2017/0344971 A1 | 11/2017 | Kargman et al. | |
| 2017/0345011 A1 | 11/2017 | Salami et al. | |

(Continued)

OTHER PUBLICATIONS

'Fronthaul and backhaul: Look out, a fusion is coming!', https://www.computerworld.com/article/3096788/virtualization/fronthaul-and-backhaul-look-out-a-fusion-is-coming.html, Jul. 18, 2016, pp. 1 to 5.

(Continued)

*Primary Examiner* — Peter G Solinsky
(74) *Attorney, Agent, or Firm* — Pillsbury Winthrop Shaw Pittman LLP

(57) ABSTRACT

Provided is a process, medium, or system including using block chain as a distributed routing environment for contract based handoff to route streaming data to edge-based data centers.

23 Claims, 3 Drawing Sheets

(56) References Cited

U.S. PATENT DOCUMENTS

| | | | |
|---|---|---|---|
| 2017/0366605 A1 | 12/2017 | Chang et al. | |
| 2017/0367120 A1 | 12/2017 | Murray et al. | |
| 2017/0374595 A1* | 12/2017 | Ou | H04W 36/0016 |
| 2018/0020503 A1 | 1/2018 | Deenoo et al. | |
| 2018/0025181 A1 | 1/2018 | Barinov et al. | |
| 2018/0084021 A1* | 3/2018 | Rubin | H04L 67/2809 |
| 2019/0098602 A1* | 3/2019 | Costa | H04W 64/003 |

OTHER PUBLICATIONS

'What are C-RAN small cells?', https://www.commscope.com/Solutions/What-Are-C-RAN-Small-Cells, Jun. 17, 2016, pp. 1 to 5.
'Handover—Wikipedia', https://en.wikipedia.org/wiki/Handover, Aug. 25, 2017, pp. 1 to 6.
'EdgeChain: Blockchain-based Multi-vendor Mobile Edge Application Placement', https://arxiv.org/pdf/1801.04035.pdf, Jan. 12, 2018, pp. 1 to 9.

* cited by examiner

DISTRIBUTED HANDOFF-RELATED PROCESSING FOR WIRELESS NETWORKS

CROSS-REFERENCE TO RELATED APPLICATIONS

This patent claims the benefit of U.S. Provisional Patent Application 62/482,835, filed 7 Apr. 2017. The entire content of each afore-listed earlier-filed application is hereby incorporated by reference for all purposes.

BACKGROUND

1. Field

The present disclosure relates generally to edge-based computing and, more specifically, to block chain as a distributed routing environment for contract based handoff to route streaming data to edge-based data centers.

2. Description of the Related Art

In the coming years, it is expected that there will be a greater need for wirelessly accessible, relatively low-latency, relatively high-powered computing placed near the edge of networks. It is expected that various machine learning and other artificial intelligence algorithms will need to process relatively high-bandwidth (e.g., more than 1 Gb/s) streams of data to output results in real-time (e.g., within 200 ms, and in some cases, less than 50 ms) after that data is acquired. Examples include processing images (e.g., in video or range-finding camera output) and other sensor data gathered by self-driving cars, autonomous drones, wearable computing devices, and other packages of sensors that move throughout (or are static) geographic areas and respond to data gathered by the sensors in real time.

Often, the amount of computing power used when executing these algorithms on this type of data exceeds the amount of computing power available on the mobile computing device moving through geographic areas, such as on-board on a car, or battery-power constraints may warrant offloading even for static devices. In many cases, uploading this data to a traditional public cloud data center to process the data and to generate actionable commands or results is too slow, in part due to the amount of time taken to convey the data over relatively large geographic distances. This is due, in part, to the time consumed transmitting the data and results from the speed of light imposing limits on how fast information can be conveyed over large geographic distances. Additional delays arise from switching and routing equipment along the path and potential congestion.

Accordingly, it is expected that there will be a need to distribute relatively high-performance computing facilities, such as data centers, over distributed geographic areas. For example, distributing the data centers every few miles in a metropolitan area, county, state, or country, rather than relying exclusively upon data centers that are geographically concentrated and serve, for example, a continent from a single geographic location. (This is not to suggest that such geographically concentrated data centers may not also be used with the present techniques.)

Existing wireless networks and related computing infrastructure are not well-suited for enabling low latency, high-bandwidth edge-based computing. For example, traditional ways of handing off connections between cellular towers in many cellular wireless networks are too slow and impose too much overhead on the network to coordinate the handoffs in these types of use cases. Many systems rely on a relatively centralized authority (like a base station controller or a mobile switching center (which is not to suggest that use of such facilities for handoffs is disclaimed)) to determine which mobile wireless radio communicates with which cellular tower and coordinate handoffs between the cellular towers, for example, as a wireless radio moves geographically out of range of one tower and into range of another, or where a device is in range of multiple cellular towers. The problem is aggravated when handoffs are between different wireless network providers. The time taken in communicating with the central authorities by the base stations can consume too much of the latency budget for many real-time data processing use cases, impeding real-time computing at the edge of networks. This issue is particularly acute where there are large bandwidth requirements, as occurs in many artificial intelligence algorithms operating upon relatively high dimensional data, such as video feeds, light detection and ranging (LIDAR) feeds, ultrasonic depth sensors, and suites of signals from other sensors carried by mobile computing platforms.

SUMMARY

The following is a non-exhaustive listing of some aspects of the present techniques. These and other aspects are described in the following disclosure.

Some aspects include a process that includes using block chain as a distributed routing environment for contract based handoff to route streaming data to edge-based data centers.

Some aspects include a process that includes obtaining, with one or more processors, a distributed-application address of a distributed handoff application, wherein: the distributed-application address is a cryptographic hash value that uniquely identifies the distributed handoff application among a plurality of distributed applications executable on peer nodes of a peer-to-peer network of computing devices; the distributed handoff application is accessible via one or more of the peer nodes identified by entries in a distributed hash table linked, directly or indirectly, via the distributed hash table, to a key value in the distributed hash table corresponding to the distributed-application address; the distributed handoff application executes on one or more peer nodes of the peer-to-peer network of computing devices; and the distributed handoff application comprises a distributed-handoff application program interface (API) by which handoff from one wireless base station to another wireless base station is coordinated at least in part by at least some of the peer nodes of the peer-to-peer network; calling, with one or more processors, the distributed-handoff API with a request to handoff a current wireless data session between a first base station and a mobile computing device to another base station, wherein: the request causes the distributed handoff application to determine one or more parameters of a handoff of the wireless data session from the first base station to a second base station, such that, after the handoff, the mobile computing device continues the wireless data session with the second base station; the determination causes the one or more parameters of the handoff of the wireless data session to be sent to both the mobile computing device and the second base station; and the determination causes a record of the second base station receiving the handoff to be stored in a tamper-evident, distributed ledger encoding records of a plurality of previous handoffs in a directed acyclic graph of cryptographic hash pointers; and receiving, with one or more processors, a result of the distributed-handoff API request and, in response, at least partially effectuating the handoff of the wireless data session from the first base station to the second base station.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
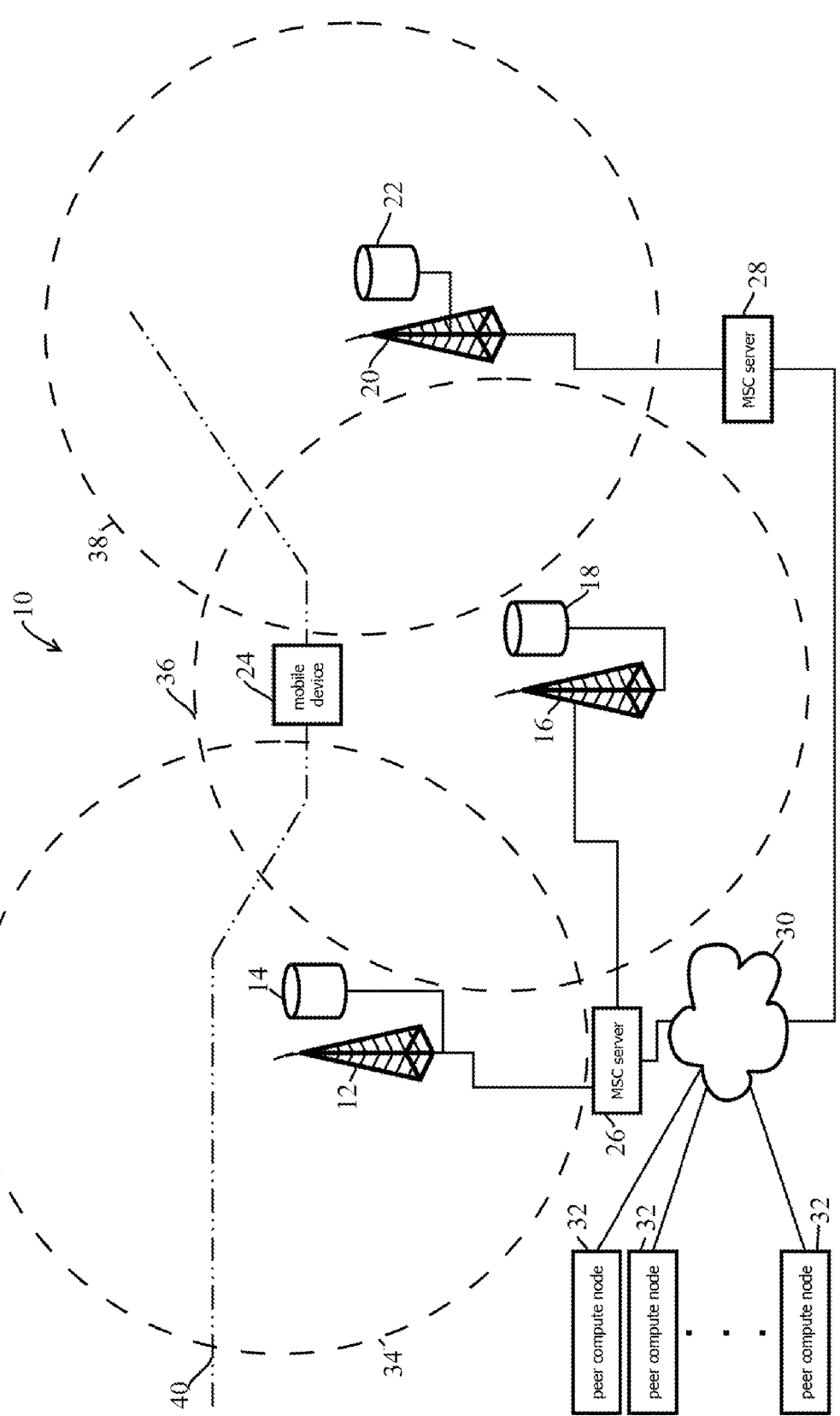
FIG. 1 is a schematic diagram of a computing environment in which various networks in accordance with the present techniques may be implemented in accordance with some embodiments.

While the invention is susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the fields of self-driving cars, artificial intelligence, and wireless networking. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

FIG. 1 shows an example of a wireless network and distributed edge-based computing environment that, in some embodiments, may mitigate some of the above-described problems. Some embodiments may leverage block chain technology to implement a distributed routing environment that provides contract-based handoff between different cellular towers or other wireless base stations (e.g., wireless access points). In some embodiments, these base stations may contain wired connections to the Internet and between one another. The base stations may serve, for example, as access points on cellular or Wi-Fi™ networks for collections of mobile computing devices within wireless range of the respective base stations (e.g., in wireless ad hoc or centrally managed mesh networks). In some embodiments, each of these base stations may be collocated with, or geographically proximate to (for example, within 1 or 10 km), an edge-located data center, for example, a collection of rack-mounted computing devices disposed within the chambers and communicating with one another using the techniques described in the following patent applications (listed by filing date, US patent application number, and title), the contents of which are hereby incorporated by reference:

Mar. 9, 2016 Ser. No. 15/065,201 COOLING SYSTEM FOR DATA CENTER RACK

Mar. 9, 2016 Ser. No. 15/065,212 OUT-OF-BAND DATA CENTER MANAGEMENT VIA POWER BUS

Mar. 9, 2016 Ser. No. 15/065,224 PATCH PANEL FOR QSFP+ CABLE

Mar. 9, 2016 Ser. No. 15/065,181 RACK FOR COMPUTING EQUIPMENT

May 26, 2016 Ser. No. 15/165,590 ADAPTERS FOR RACK-MOUNTED COMPUTING EQUIPMENT

May 31, 2016 62/343,252 AUTONOMOUS DISTRIBUTED WORKLOAD AND INFRASTRUCTURE SCHEDULING

Jul. 1, 2016 Ser. No. 15/200,961 COMPACT UNINTERUPTABLE POWER SUPPLY

Jul. 25, 2016 Ser. No. 15/218,650 RACK FOR COMPUTING EQUIPMENT

Sep. 6, 2016 Ser. No. 15/257,105 BUS BAR POWER ADAPTER FOR AC-INPUT, HOT-SWAP POWER SUPPLIES

Oct. 28, 2016 Ser. No. 15/337,732 SENSING LOCATION OF RACK COMPONENTS

Oct. 30, 2016 Ser. No. 15/338,402 HOT-PLUGGABLE CONNECTION FOR DATA COMMUNICATIONS

Nov. 28, 2016 Ser. No. 15/362,025 RACK FOR COMPUTING EQUIPMENT

Dec. 1, 2016 Ser. No. 15/366,554 DATA CENTER MANAGEMENT

Dec. 1, 2016 Ser. No. 15/366,528 DATA CENTER MANAGEMENT

Jan. 6, 2017 Ser. No. 15/400,648 DATA CENTER MANAGEMENT VIA OUT-OF-BAND, LOW-PIN COUNT, EXTERNAL ACCESS TO LOCAL MOTHERBOARD MONITORING AND CONTROL

In some embodiments, as a mobile computing device moves through a geographic area, into range of some of the base stations in that area and out of range of other base stations in that area, the mobile computing device may gather data with a set of sensors, like cameras, LIDAR, radar, ultrasonic range finding, inertial measurement unit readings, satellite navigation sensors, or dead reckoning based on measured wheel rotations, compasses, and the like. In some embodiments, the mobile computing device may transmit data gathered by the sensors wirelessly to one of the above-described base stations, such as a cellular tower within range. An edge-based data center may be associated with the respective base station. The respective edge-based data center may ingest this streamed data; apply various artificial intelligence, such as machine learning, algorithms; and output a response back to the mobile computing device via the wireless network.

In some embodiments, this response to the streamed data may be sent in real time, for instance, within less than 100 ms of when the data was gathered, for example, within less than 50 ms or less than 10 ms of when the data is gathered.

In some cases, the volume of data streamed may be relatively large, for example exceeding 1 Gb per second, and in some cases, exceeding 10 Gb per second, depending upon how many sensors are in use and the type of sensor.

In some embodiments, the mobile computing device may receive this result and take responsive action. For example, embodiments may receive a result of the edge-based data center classifying an object in the field of view of the mobile computing device's camera (such as a depth-sensing imaging device) as a person. In response, the mobile computing device may adjust a steering direction of a self-driving car to avoid the person or apply brakes to stop before hitting the person. In some cases, a variety of other responsive actions may be taken, including determining to adjust a speed or direction of steering to maintain a target position along a route, for example, within a particular lane on the road. Other examples include classifying an upcoming turn as corresponding to a turn along a targeted route, classifying other objects as corresponding to other motor vehicles within the field of view of the camera, or the like and avoiding those other objects, among many tasks that may be performed.

Some embodiments may make similar classifications at edge-based data centers responsive to data gathered by other types of static or mobile Internet of things appliances. For instance, embodiments may receive a video feed stream (or audio stream, or three-dimensional range finding stream) from a plurality of cameras in a house and classify moving objects as corresponding to authorized residents or an intruder. Or embodiments may ingest an audio feed from a microphone on such an appliance and perform speech-to-text conversion.

In some embodiments, this distributed system may execute a distributed algorithm implementing ad hoc distributed routing of communication between the mobile computing device and the various base stations, such as cellular towers along a route driven by a self-driving car or flown by an autonomous drone.

To this end or others, in some embodiments, the mobile computing device may include a geolocation sensor, such as a global positioning system or GLONASS sensor, operative to sense a geolocation of the mobile computing device based on timing signals in beacons transmitted by arrays of satellites received by the sensor. In some cases, the mobile computing device may output a latitude, longitude, altitude, and confidence radius or sphere.

Further, in some cases, the mobile computing device may include a radio configured to wirelessly communicate with the above-described base stations, such as cellular towers along a route navigated by an autonomous drone or self-driving car. In some embodiments, the radio may be configured to sense identifiers broadcast by these base stations and measure (and associate with the identifiers) a signal strength of signals from these base stations, such as a received signal strength indicator (RSSI), a signal-to-noise ratio (SNR), or a signal to interference and noise ratio (SINR).

In some embodiments, the location of the mobile computing device, as sensed by the geolocation sensor, the list of base stations, and measures of signal strength of those base stations may be transmitted by the radio of the mobile computing device to base stations within range of the mobile computing device, for example, periodically in a beacon, like every 10 ms or more or less frequently. In some embodiments, the base stations may include corresponding radios that receive these beacons, along with an identifier of the mobile computing device that distinguishes the mobile computing device from other mobile computing devices configured to wirelessly access a network provided by a collection of base stations. In some embodiments, this information may be embedded in a field of a header in a beacon or packet transmitted on such a network.

In some embodiments, the base stations may communicate between themselves via a wired or wireless network to determine which base station will wirelessly communicate with the mobile computing device and effectuate handoffs between base stations when the mobile computing device moves geographically between areas where one base station is more suitable to a different geolocation where another base station is more suitable. For example, handoffs may be based on the base stations having different signal strengths as perceived by the mobile computing device, load supported by those respective base stations, interference with signals from the respective base stations experienced by the mobile computing device, or a combination thereof.

In some embodiments, the base stations may make handoff determinations independently of a central authority, such as without the handoff being fully controlled or controlled at all, depending upon the embodiment, by a central authority that manages handoff between 5 or 10 or more cellular towers. As a result, some embodiments may effectuate handoffs relatively quickly, without delays while information is sent to a central authority, processed by the central authority, and sent back to the base stations. Further, some embodiments may avoid relatively high communication overhead in networks in which a single central authority manages a relatively large number of base stations over a large geographic region.

In some embodiments, the mobile computing device may broadcast packets, such as Internet Protocol packets, addressed to a receiving Internet Protocol (IP) address. And in some embodiments, the different base stations may assign this IP address to the base station selected to communicate wirelessly with the mobile computing device using the techniques discussed above. For example, a given IP address may travel with the mobile computing device across a metropolitan area, causing packets sent by the mobile computing device to go to different base stations at different times based upon which base station has claimed that IP address, based on the location and signal strength indicated by the mobile computing device at the different times, and as memorialized and determined based on a block chain ledger. And packets may be routed from other entities through the network to the IP address of the mobile device via different base stations based on reference to such a ledger.

In some embodiments, the mobile computing device may include directional antennas that are reoriented based on a base station chosen to communicate with the mobile computing device. For example, upon two base stations communicating between themselves to determine which will communicate with the mobile computing device, a resulting chosen base station may send an identifier and an indication of the result of the determination back to the mobile computing device. In some embodiments, the mobile computing device may access a repository of geolocations of base stations stored in memory of the mobile computing device, or retrieve geolocations of the base stations via the wireless network noted above. In some embodiments, the mobile computing device may determine a location of the mobile computing device and a location of the selected base station and point a directional antenna of the mobile computing device at the selected base station (e.g., by changing an angular targeted set point of an actuator to rotate an antenna array). In some embodiments, the local computing device may maintain alternate sets of antennas used during handoffs. In some cases, one directional antenna may be reoriented towards an upcoming base station to be selected next, while a currently used directional antenna is oriented towards a base station currently supporting wireless connection with the mobile computing device.

In some embodiments, as the mobile computing device moves through a geographic region, a set of one or more localized micro zones may be created in the geographic area within wireless range of the mobile computing device, dynamically via the signal strength indication and geolocation, according to an IP address handoff to base stations that manage communication in the micro zone. In some embodiments, the mobile computing device may broadcast data gathered by sensors carried by the mobile computing device to the same IP address. That data gathered by the sensors may be received by the assigned base station, advanced by that base station to an edge-based data center associated therewith, and processed and responded to with the techniques described above.

In some embodiments, contract-based handoff may be implemented with a relatively low-latency block chain implementation, for example, based on the Hyperledger™ digital crypto ledger. In some cases, some embodiments may omit proof of work and proof of stake functions to expedite operations (or some embodiments may include these features, which is not to suggest that other features described herein may not also be omitted in some cases). In some embodiments, wireless base stations within range of a mobile computing device, or within a geographic area, may arrive at a consensus as to which base station will communicate with the mobile computing device based on an implementation of the Raft consensus protocol, for example, by implementing Byzantine fault tolerance. In some cases, the consensus protocol may be that described by the following paper available at raft.githumb.io and incorporated by reference: Ongaro, Diego; Ousterhout, John (2014), "In Search of an Understandable Consensus Algorithm (Extended Version)." Some embodiments may implement an implementation of the Paxos consensus algorithm or other type of consensus algorithm.

In some embodiments, wireless base stations may include computing devices that implement the functionality described herein. In some embodiments, to arrive at a consensus on handoff (or handoff and program state, or just program state, for a dynamic federated cluster that moves with the mobile computing device onto different edge-based data centers associated with base stations designated to communicate with the mobile computing device) the wireless base stations may elect a leader, and upon an elected leader failing, elect another leader. In some embodiments, some of the wireless base stations may be designated as a candidate or a follower, depending upon role. In some embodiments, an elected leader may periodically send a heartbeat message, for example, via a wired backhaul or crosshaul network (e.g., a network that serves the function of a backhaul network but without a central authority assigning roles to base stations and with the base stations determining roles with peer-to-peer communications in a distributed algorithm) connected to the Internet, to other base stations in the same cluster. For example, base stations in the same geographic region or in wireless range of the mobile computing device. In some cases, upon other computing devices in other base stations determining that a heartbeat has not been received within a threshold amount of time, some embodiments may initiate a new leader election.

In some cases, leaders may be elected and consensus may be reached with the techniques described in U.S. patent application Ser. No. 15/366,528, filed application Ser. No. 15/366,528, titled DATA CENTER MANAGEMENT, the contents of which are hereby incorporated by reference.

In some cases, the edge-based data centers associated with the various base stations may execute various distributed training streaming platforms, such as Apache Kafka™, that process streaming data from the mobile computing devices, for instance, received an association with IP addresses claimed by the base stations using the techniques described above, as a mobile computing device moves into wireless range of the base station. Some embodiments may implement various real-time complex event processing systems as well, for example Apache Flink™ or Apache Spark™.

In some cases, the edge-based data centers may include a plurality of tenants corresponding to public cloud providers. API requests may be routed within the edge-based data centers to computing devices (or virtual machines) associated with those public cloud providers and hosted within the respective edge-based data center, for example, based upon virtual machines or computing devices indicated in network requests.

Some embodiments may further construct dynamic cluster federations on these edge-based data centers, for example with Kubernetes™ kubefed functionality. Some embodiments may process streaming data within resulting dynamic cluster federations, for instance, that travel with the mobile computing device to different edge-based data centers associated with different base stations, in some cases, receiving and subscribing to data routed to the same IP address by the mobile computing device, without regard to which base station is being communicated with. Some embodiments may implement serverless functions, e.g., on unikernels, that are stateless and are instantiated and spun down on a given edge-based data center to provide corresponding functionality to a mobile computing device as the mobile computing device moves through an area served by the edge-based data center. Thus, some embodiments may avoid additional delay resulting from round-trip exchanges with a domain name service to map, for example, Uniform Resource Identifiers (URIs) to Internet protocol addresses, or to convey an updated IP address to the mobile computing device each time a handoff occurs.

In some cases, the blockchain functionality referenced above may implement handoffs according to smart contracts implemented on the blockchain. In some cases, the smart contract may encode a set of criteria by which pairwise combinations of base stations within wireless range of a mobile computing device negotiate and commit to a handoff decision, in some cases, even across different networks of base stations operated by different entities. For example, a pair of base stations may both receive a beacon from a mobile computing device indicating a set of base stations detected by the mobile computing device's radio, measurements of signal strengths for those base stations (including the pair) perceived at the mobile computing device by its radio, and a geolocation of the mobile computing device (and in some cases, a velocity and route of the mobile computing device). The base stations may negotiate and enforce a contract based on this gathered data and, for example, amounts of available bandwidth at the base stations (or predicted amounts available based on routes of other mobile computing devices). In some cases, the smart contract may be memorialized within the blockchain, along with offers, counter offers, and acceptance algorithmically submitted to the block-chain ledger.

Various protocols and applications may be implemented using media access control and routing techniques, like those described above. Examples include traditional web traffic over TCP/IP. Other examples include multipath TCP traffic and UDP traffic. Some embodiments may implement peer-to-peer protocols for various functions (like data storage, messaging, consensus determinations, elastically scaling resources, orchestrating containers/unikernels/virtual machines, workflow management, and message routing), like Interplanetary File System (IPFS)™, BitTorrent™, and various other mesh networks, such as those implementing peer addressing with various types of distributed hash tables, like CAN, Chord, Pastry, or Tapestry. Thus, some embodiments provide an intelligent wired or wireless mesh routing environment to enable contract based service activation/handoff to implement these various protocols, related services, and related applications.

In some cases, some or all of the above-describe techniques may be implemented in a computing environment 10 shown in FIG. 1. In some embodiments, the computing environment 10 may span a geographic area, such as a geographic area having several base stations and edge-based data centers, like base stations 12, 16, and 20, and edge-based data centers 14, 18, and 22. Three pairs of base stations and edge-based data centers are shown, but commercial implementations are expected to include substantially more, for instance, more than 1000, more than 10,000, or more than 50,000 such pairs. In some cases, the pairs of base stations and data centers may be distributed over a geographic area, for instance, regularly arrayed in order to provide wireless coverage and low-latency processing over more than 10 mi.$^2$, 1000 mi.$^2$, the entire United States, North America, or the world.

The base stations 12, 16, and 20 may each have regions of coverage for wireless data (e.g., voice or nonvoice data signals), corresponding to regions 34, 36, and 38 respectively. In some embodiments, a mobile computing device 24 may move among these various regions, for instance, along a route 40. The mobile computing device 24 may be a mobile handset, a tablet computer, a laptop, a self-driving automobile, such as a level III or higher self-driving automobile, an autonomous drone, or the like. In some cases, the role of the mobile computing device 24 may be filled by a computing device that is nonmobile, for instance by various in-home or in-business computing appliances with a need to offload computing tasks to the data centers 14, 18, and 22. The static computing tasks may be things like a home security systems needing to offload image recognition tasks, smart speakers needing to offload audio classification and speech to text tasks, home automation appliances responding to environmental queues, and the like.

In the illustrated example, each base station 12, 16, and 20 is paired with a different data center 14, 18, and 22. But other embodiments may have a different ratio, which is not to suggest that any other description herein is limiting. In some embodiments, the edge-based data centers 12, 18, or 22 may each serve a plurality of base stations. For instance, embodiments may include some base stations that share a baseband controller and are located some distance away from one another, such as more than 100 meters or more away from one another, with overlapping coverage. In some cases, the shared baseband controller may interface with each of the base stations it controls and cooperate with the below-described mobile switching controller servers to route network connections via the respective ones of the base stations. For instance, a given baseband controller may control two, four, eight, or sixteen different base stations. In some cases, the baseband controller may form a crosshaul network by which calls are routed. In some cases, each baseband controller may be associated with a respective edge-based data center, and that edge-based data center may be shared by a number of base stations controlled by the respective baseband controller, such as less than 32 base stations.

In some embodiments, the illustrated edge-based data centers 14, 18, and 22 may be physically proximate the base station or base station controller with which they are associated. In some embodiments, each edge-based data center may be located within 1 km, within 10 km, or may be integrated with, for example in a single physical site the respective base stations or baseband controllers. In some embodiments, the edge-based data centers may be formed within the same enclosure as the respective baseband controllers, located within the same perimeter fence as the respective baseband controllers or base stations, or otherwise be closely positioned. In some embodiments, the edge-based data centers 14, 18, and 22 may share various facilities with the respective base station or baseband controller, for example, power, network connections, heating, air conditioning, air circulation, physical buildings, concrete pads, and the like. In some embodiments, the edge-based data centers 14, 18, and 22 may be on a private local area network with their respective base station or baseband controller, for instance, connected by a relatively high-bandwidth optical or wired connection.

In some embodiments, the edge-based data centers may each be one of the chambers in the various references incorporated by reference above, for instance, having a plurality of racks arranged around a central cooling passage. In other cases, some embodiments may use a traditional rack design with a hot aisle.

In some embodiments, the edge-based data centers 14, 18, and 22 may collectively form a distributed cloud computing environment in which computing resources are positioned physically proximate to computing devices that consume those resources, and in some cases, the consumer devices move through a geographic area in which a plurality of such edge-based data centers cooperate to serve a computing load of the consumer devices. In some embodiments, the edge-based data centers 14, 18, and 22 may form a peer-to-peer network of edge-based data centers that is relatively easily scaled by adding additional peers to the network and is managed with the various data center management techniques and rack controllers in the references described and incorporated by reference above.

In some embodiments, the edge-based data centers 14, 18, and 22 may be operated by a single entity and may expose a single application program interface for provisioning computing resources, which may include instantiating virtual machines, orchestrating containers, instantiating unikernel instances, and spinning down these resources when no longer needed. Further, this application program interface may expose services by which network addresses are assigned or managed, data is stored, data is accessed, machine images or unikernel images are configured, monitored, discovered, and the like.

In some embodiments, different subsets of the base stations may be operated by different entities, for instance, different cellular network providers or different mobile switching telephone centers. In some embodiments, base stations 12 and 16 may be operated by a first cellular carrier, and base station 20 may be operated by a different cellular carrier. As a result, base stations 12 and 16 may communicate with one another and be controlled by a mobile switching center server 26, while base station 20 may be controlled by and communicate with a different mobile switching center server 28. In some embodiments, these mobile switching center servers 26 and 28 may both connect to the Internet 30, such as various backbone networks of the Internet.

In some embodiments, the computing environment 10 further includes a collection of peer compute nodes 32 that may cooperate to execute various distributed applications, some of which may coordinate handoffs among the various base stations. In some embodiments, the compute nodes 32 may execute on the various edge-based data centers 14, 18, and 22, for instance, consuming a subset of the computing resources on each of these data centers, or in some cases the peer compute nodes 32 may execute elsewhere. In some embodiments, the peer compute nodes 32 execute client applications of a distributed, ad hoc, peer-to-peer computing application, such as various block-chain-based applications, like Bitcoin, Ethereum, FileCoin, IPFS, and the like.

In some embodiments, the peer compute nodes 32 may host one or more distributed hash tables (DHT) by which resources are accessed by distributed applications and by which different peer compute nodes are determined to have various resources. The DHT architecture may relatively efficiently route commands, data, output or output results of operations to peer compute nodes of a given key, like users or other applications. In some embodiments, various DHT architectures may be implemented, for instance, Chord, Kademlia, or Ethereum's implementation of Kademlia. Thus, an address space may be created and managed by peer compute nodes 32 without a central authority routing messages or managing the address space, making the system relatively robust to failure of any one the peer computing node 32.

In some embodiments of the DHT, the peer compute nodes may be organized on a unidimensional identifier ring, such as a set of sequential addresses that upon reaching a maximum value reset to a minimum value when incrementing through the address space, or a linked list that forms a ring. The ring may include a relatively large amount of peer compute nodes, for instance, more than 20, more than 100, more than 1,000, or more than 10,000 peer compute nodes (which may be peer computing devices, or one of several virtual machines, containers, unikernels, or processes executing on the peer computing devices). Each peer compute node 32 may be assigned a node ID, such as a unique 160 bit key determined by a cryptographic hash function, for instance, SHA or MD5, and organized on an identifier ring, based on their assigned node ID. Various resources, e.g., files, stored on the peer compute node may be input into a cryptographic hash function to generate resource identifiers, and then stored by a peer node in the ring at a peer compute node closest to the hash identifier of the resource. Each peer compute node may maintain partial routing information (e.g., a subset of a list of key-value pairs that associate IP addresses (and port numbers in some cases) of peer compute nodes with corresponding node IDs for the entire DHT). Nodes may be reached via successive, sequential forwarding by other peer compute nodes to efficiently route resources across two, three, four, or five or more hops, getting closer with each hop to a node with the appropriate subset of the list in memory to identify the IP address of a node with the accessed resource. For instance, peer compute nodes P0, P5, P10, P15, P20 . . . PX, may be arranged in the consecutive order around a ring data structure. In the ring, the peer compute nodes may maintain direct connections to their successor and predecessor peer compute nodes along the ring (e.g., they may have in memory the IP address, port number, and an index of resource identifiers stored therein for adjacent nodes, such that adjacent nodes can be reached without requesting routing services by some other node in the ring). The key value pairs, for instance, of node ID of P10, is stored in the of the successor peer compute node P15, as well as replicas of the data at node P10. If the peer compute node P10 fails, peer compute node P15 becomes responsible also for the ID space of peer compute node P10, including the key, thereby, potentially maintaining access for the DHT to the data of peer compute node P10.

In some embodiments, the exchange of data may be facilitated through peer compute node lookup. The peer compute nodes may communicate among themselves using User Datagram Protocol (UDP), forming an overlay network (e.g., at the transport layer or application layer). Each peer compute node 32 may have a unique 160 bit key, which may be a node ID, and may be determined by a cryptographic hash function. The node ID may identify the given peer compute node 32 on the network and may provide a direct map on how to locate a particular hash value associated with an object, for instance, a file. In some embodiments, upon failure of a peer compute node 32 (e.g., failure to send a heartbeat signal or failure to a request within some threshold duration), neighboring peer compute nodes may discover the failed peer compute node and calculate the range of impact of the failure, according to the distance between the node ID of the neighboring peer compute node and the node ID of the failed peer compute node. The distance (in the DHT address space) between the neighboring peer compute nodes and the failed peer compute node may be calculated using 'exclusive or', (XOR). For instance, the distance between two binary peer compute nodes, 0011 and 1001, may be calculated by taking the 'exclusive or' of the two numbers (e.g. 0011 $\oplus$ 0011) to obtain 1010, which may be the substitute peer compute node. As shown, the XOR operator may reveal the bit positions that are different between the two numbers.

In some embodiments, distributed applications may be deployed to peer-to-peer computing environments hosted by the peer compute nodes 32, for instance within a Ethereum, FileCoin, IPFS, or combinations thereof. In some embodiments, each distributed application may be assigned an address, and an application program interface of the respective distributed application may be called within the peer-to-peer computing environment by associating that address with a corresponding application program interface request. In some embodiments, the address may be a public key or may include a public key associated with a private key of the respective peer-to-peer application or a user. In some cases, various messages related to the application may be cryptographically signed with the private key. Other computing nodes may validate that such messages were signed by an entity with access to the private key based upon the corresponding public key. In some cases, messages to the application or other entities may be encrypted with the corresponding public key that also, in some instances, serves as an identifier, and the corresponding entity may decrypt the message with the corresponding private key. In some embodiments, the public and private keys are provided with various public key infrastructure algorithms, such as RSA, DSA, or ECDSA.

Figure 2:
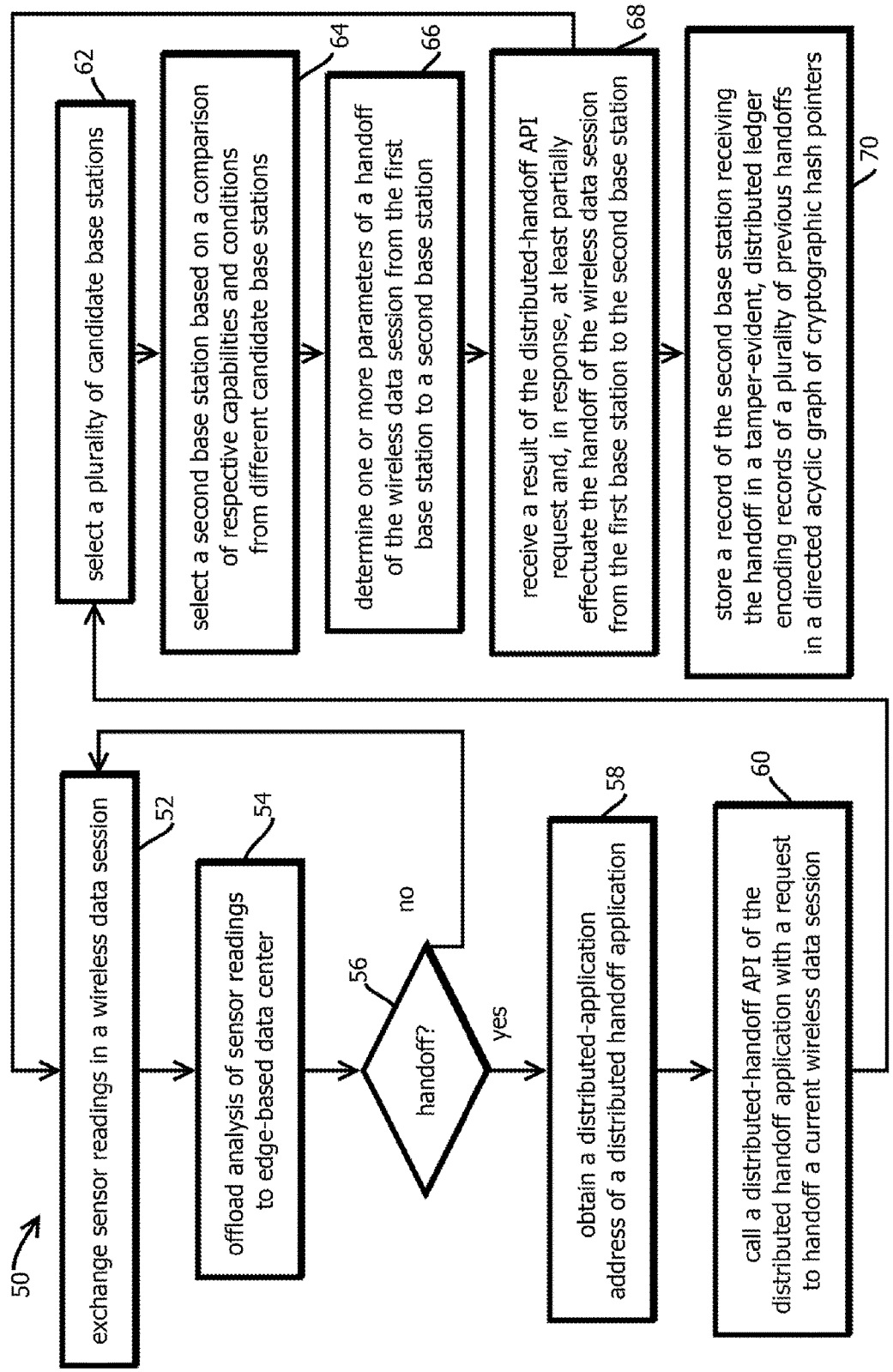
FIG. 2 is a flowchart of a process that may be implemented in the computing environment of FIG. 1 to effectuate handoffs between wireless base stations in accordance with some embodiments.

In some embodiments, one or more of the distributed applications may execute one or more routines in a distributed fashion on peer compute nodes 32 by which wireless handoffs are effectuated. In some embodiments, this may include cooperating with other portions of the computing environment 10 to execute the process 50 of FIG. 2. In some embodiments, the various operations of the process 50 may be executed in a different order, operations may be omitted, operations may be replicated, additional operations may be included, some operations may be performed concurrently, some operations may be performed sequentially, and multiple instances of the process 50 may be executed concurrently, none of which is to suggest that any other description herein is limited to the arrangement described. In some embodiments, the operations of the process 50 may be effectuated by executing program code stored in one or more instances of a machine-readable non-transitory medium, which in some cases may include storing different subsets of the instructions on different physical embodiments of the medium and executing those different subsets with different processors, an arrangement that is consistent with use of the singular term "medium" herein.

In some embodiments, the process 50 includes exchanging sensor readings in a wireless data session, as indicated by block 52. In some cases, this may include the above-describe mobile computing device 24 gathering data about its environment with various sensors of the mobile computing device 24. This may include capturing images, such as in a video feed with a plurality of cameras, capturing depth-sensor readings, for instance with a light detection and ranging (LIDAR) sensor, sensing audio data with a microphone, and the like.

Some embodiments may offload analysis of the sensor readings to an edge-based data center, as indicated by block 54. In some embodiments, as a mobile computing device 24 moves along the illustrated route, the offloaded analysis may be offloaded to different ones of the data centers shown in FIG. 1. For example, the offloaded analysis may be performed by a data center associated with a base station to which the mobile computing device 24 is participating in a wireless data session. As a wireless data session is handed off, the edge-based data centers may similarly handoff ongoing analysis, and in some cases executing the analysis concurrently until a state of a subsequent data center is equal to or has superior data relative to a previous edge-based data center. The superiority of data may be determined by calculating a half-life score of an aggregate amount of received data and determining when a difference in the score for a new data center from that of a previous data center is less than a threshold.

In some embodiments, this may also include sending wireless data to the mobile computing device, for instance, from a network, or as a result of operations by the edge-based data centers. For example, a self-driving car or an autonomous drone may gather relatively high dimensional high-bandwidth data, such as multiple video feeds, a LIDAR feed, or both, and convey that via a wireless connection to a given one of the base stations, which may then convey it to an associated data center. The associated edge-based data center may then execute various machine-learning algorithms, for instance, convolution neural networks, or the like, configured to classify the images or detect features within the images or objects within the images. Examples include identifying pedestrians or other cars or detecting features corresponding to lines in a road. In some cases, the results of these operations may then be conveyed back to the mobile computing device 24 via the wireless data session, for instance, values indicating where within a frame of video (or LIDAR scan) various objects are detected, and polygons bounding those objects. Some embodiments may infer a three-dimensional environment and send a model of the three-dimensional environment with classifications applied to various items within the three-dimensional environment back to the mobile computing device. In some embodiments, the edge-based data center may determine how to adjust actuators on the mobile computing device 24 responsive to the sensor data, for instance, determining a direction (and amount and rate) in which to turn a steering wheel to reorient a tire, determining an amount of torque or horsepower (and rate of change) to apply to a given one of the wheels or each of the wheels, determining whether to apply brakes, determining a set point for any of six axes of a flying drone, or the like.

Some embodiments may periodically determine whether to handoff a mobile computing device wireless data session between base stations, as indicated by block 56. In some embodiments, the handoff determination may be made by a current base station or baseband controller to which the mobile computing device is currently connected. The determination may be made responsive to a signal-to-noise ratio dropping below threshold, an amount of dropped packets exceeding a threshold, an amount of available bandwidth falling below the threshold, or the like. Or in some cases the handoff determination may be made by the mobile computing device 24 based on similar criteria. Upon determining that no handoff is needed, some embodiments may return to block 52 and continue exchanging sensor readings and analyzing the sensor readings with the edge-based data center, as indicated by block 54, for instance, via the various application program interfaces described above for distributed cloud computing environments having edge-based data centers.

Alternatively, upon determining to perform handoff, some embodiments may coordinate the handoff with one of the above-described distributed applications executing on the peer computing devices of FIG. 1. In some embodiments, this may include calling a Turing-complete block-chain-based smart contract (e.g., an Ethereum smart contract) by which different base stations, different mobile switching centers, different baseband controllers, or different cellular carriers coordinate handoffs. In some embodiments, different distributed applications may select the subsequent base station for the handoff and coordinate the handoff, or in some cases a single distributed application, such as a single block chain smart contract may coordinate the handoff In some embodiments, a subset of the universe of base stations participating in one of the smart contracts may be selected, for instance, by querying a geographic information system with a current geolocation of the mobile computing device, and in some cases a velocity of the mobile computing device and a route of the mobile computing device across a geographic area, such as a route programmed into an autonomous drone or a self-driving car. In some embodiments, a geographic information system, such as a wireless database having coverage areas and geolocations of various base stations and parameters thereof (e.g., coverage area, available bandwidth, speed, SINR, SNR, and supported protocols) may respond with a selection of candidate base stations or a given base station with which to coordinate a subsequent handoff In some embodiments, these operations may be performed by a smart contract executing on the ad hoc peer-to-peer distributed computing applications on peer computing devices 32.

In some embodiments, the process may include obtaining a distributed application address of this distributed handoff application, as indicated by block 58. In some cases, this address may be an address of one of the distributed applications described above, such as an address that serves as an entry point into a distributed hash table. In some embodiments, the process 50 includes calling the distributed handoff application program interface of the distributed handoff application with a request to handoff a current wireless data session, as indicated by block 60. In some embodiments, the call may be initiated by a mobile computing device or by one of the base stations, such as a base station seeking to handoff a current wireless data session. In some embodiments, the application program interface called may include an identifier, such as a public cryptographic key that serves as an identifier of a base station to which a handoff is sought. In some cases the call may include various parameters by which such a base station may be selected, for example, a geolocation of the mobile computing device, a velocity the mobile computing device, a route through geographic area of the mobile computing device, wireless radio capabilities of the mobile computing device, wireless protocol supported by the mobile computing device, an amount of bandwidth expected to be consumed by the mobile computing device, a service level required by the mobile computing device, or the like.

In some embodiments, the call to the distributed handoff application program interface may be routed via one of the above-described distributed hash tables to one or more of the computing devices in the peer-to-peer distributed computing environment described above, which may include a Turing-complete block chain implementation, like Ethereum, configured to execute a smart contract by which a handoff is effectuated, for instance, based on parameters in the distributed handoff application program interface request. In some embodiments, every peer node on a DHT (or a sharded subset of peer nodes) may execute the code of the smart contract invoked by the distributed handoff application program interface call. The peer nodes that evaluate the smart contract may determine a response to the API call based on the above-described distributed consensus algorithms, e.g., by arriving at a consensus as to the correct response, for instance with a majority vote among those peer nodes that compute the API response or those peer nodes that both compute the API response and demonstrate a proof of work, proof of storage, or proof of stake solution. Thus, some embodiments may be robust to untrusted peer compute nodes in which a malicious actor may attempt to interfere with the distributed handoff application, as other peer nodes may arrive at a consensus based on an un-adulterated response to an API request.

Some embodiments may include selecting, with the smart contract executing on the computing devices, a plurality of candidate base stations, for instance, responsive to the handoff application program interface request (or as noted above this operation may be performed in a different distributed handoff application or a non-distributed application), as indicated by block 62.

Some embodiments may then select a second base station based on a comparison of respective capabilities and conditions from different candidate base stations, as indicated by block 64. Again, this may be performed within a distributed peer-to-peer ad hoc computing environment like those described above, or in a centralized database.

Some embodiments may determine one or more parameters of the handoff of the wireless data session from the first base station to a second base station, as indicated by block 66. In some cases, these parameters may include a time of the handoff, a cryptographic key, such as a public cryptographic key of the mobile computing device by which the second base station is to communicate in the wireless data session with the mobile computing device, broadcast strength, broadcast channels, wireless data protocols, session identifiers, programmed state of offloaded analysis of sensor readings, and network addresses of the mobile computing device. In some embodiments, these receive parameters may be conveyed to the second base station or a baseband controller of the second base station. The handoff may be effectuated by transitioning the wireless data session from the first base station to the second base station, in some cases, within less than 100 ms of initiating the handoff, and some cases with less than 50 ms of loss of wireless data coverage. In some cases, these determined parameters may further include terms for payment between the operators of the different base stations, in some cases with different base stations bidding on the opportunity to participate in the wireless data session in the distributed smart contract, for instance, bidding with payment terms, service levels, bandwidth, or combinations thereof. In some embodiments, the smart contract may be configured to score each of the bids, for instance, with a weighted combination of bid parameters and to calculate a highest-scoring bid upon a threshold time or threshold number of bids being exceeded and select the highest-scoring bid. In some embodiments, two, three, five or more base stations with overlapping coverage may bid for the opportunity to continue the wireless data session.

Some embodiments may receive a result of the distributed handoff API request and, in response, at least partially effectuate the handoff of the wireless data session from the first base station to the second base station, as indicated by block 68. In some embodiments, the second base station may continue communicating in the wireless data session with the mobile computing device using the received determined parameters. In some embodiments, this may include transitioning a state of a program analyzing the sensor readings between different edge-based data centers, like those described above. In some embodiments, this may include instantiating different computational entities, like virtual machines, containers, unikernels, or the like on the subsequent edge-based data centers and initiating a program state of programs executing in those computing entities, for instance, with data fed concurrently to the older and newer edge-based data centers for a threshold duration of time and with various parameters of an ongoing computing task, like a route of the mobile computing device, a velocity of the mobile computing device, or the like. Output of the older (in a wireless session) edge-based data center may be fed to both the mobile computing device and the newer edge-based data center concurrently and used to update state of the newer edge-based data center.

In some embodiments, the mobile computing device may be provided with a consistent network address that follows the mobile computing device across different base stations, such as an Internet Protocol address or an address in one of the above-described peer-to-peer distributed computing environments, like an address in a distributed hash table by which resources are accessed in these computing environments. In some embodiments, the mobile computing device may have an address like that assigned to the distributed handoff application and may constitute an entity in one of these computing environments. In some embodiments, the mobile computing device may maintain the same IP address across different base stations with a record mapping the Internet Protocol address of the mobile computing device to the current base station with a record that is updated during handoff to reflect the newly assigned base station. In some embodiments, this record may be stored as program state in one or more of the above-described distributed computing applications. Other computing devices seeking to communicate with the mobile computing device, for instance in the wireless data session, may cause the distributed computing application to look up the current base station to which the mobile computing device is communicating in these records, for instance retrieving a value from a block chain ledger indicating a result of the handoff after the handoff has occurred.

Some embodiments include storing a record of the second base station receiving the handoff in a tamper-evident, distributed ledger encoding records of a plurality of previous handoffs in a directed acyclic graph of cryptographic hash pointers, as indicated by block 70. In some embodiments, the cryptographic hash pointers may include a plurality of blocks arranged in a chain, with each block including a cryptographic hash pointer to a previous block, and the blocks arranged sequentially in an order of creation. In some embodiments, each block may include a Merkel tree, such as a binary tree of cryptographic hash pointers with leaf nodes storing the record or previous records of previous handoffs. In some embodiments, each cryptographic hash pointer may include a cryptographic hash value determined by a cryptographic hash function, for instance, SHA-1, SHA-2, SHA-3 or MD5. In some embodiments, the cryptographic hash values may be based on a content of a node, or a plurality of nodes, to which the cryptographic hash pointer point, and content of each node may include its respective cryptographic hash pointer hash values.

In some embodiments, an Internet Protocol address of the mobile computing device may be stored in a block chain or in one of the above-described distributed hash tables. In some embodiments, these records may be interrogated in order to communicate with the mobile computing device with a consistent address of the mobile computing device as the mobile computing device moves between base stations.

Thus, as noted above, in some embodiments, an Internet Protocol address may serve as a persistent identifier of a wireless mobile computing device moving through a geographic area and having wireless connections that are handed off between different wireless base stations, thereby dynamically changing the physical network node through which a computing device is accessible at a given networking layer address.

Alternatively, or additionally, some embodiments may implement the present techniques with name resolution, where a persistent, unique name for a computing device is held constant while other addresses (e.g., at different layers of the OSI stack) potentially change over time and location. For instance, rather than, or in addition to, a persistent IP address, hosts on the network may be assigned a name in a namespace in which each device has a unique name and different IP addresses may be mapped to the same name at different times. In some cases, name resolution may be performed at the data link layer, for instance, at the medium access control (MAC) sublayer of the data link layer. Thus, the registration of new devices in a wireless "zone/region" may be translated (between device name and network address) at the MAC level in the OSI stack. In some cases, resolution of names to network addresses may cascade up to layer 3 of the OSI model, where routing takes place (e.g., at the layer implementing Internet Protocol exchanges), and in some embodiments, ultimately up to layer 7 for application-layer exchanges, including intermediate layers, like transport layer exchanges at layer 4, where UDP and TCP reside or other transport layer protocol communications reside. It should be emphasized, though, that the present techniques are not limited to the current OSI model, as it is contemplated that a new networking stack could be built on top of the present techniques, which is not to suggest that any other description herein is limiting.

In some embodiments, a persistent name may be assigned to each computing device expected to serve as an endpoint on the network described above with reference to FIG. 1 (e.g., a host). In some embodiments, each computing device may be assigned a different name. In some embodiments, the name is a human readable name, like a domain name, such as a hierarchical human readable name having reserved characters that serve as delimiters between different levels of the hierarchy (e.g., autonomous-vehicles.ford.f150.2019.smith1). Another example may be a non-human readable, such as arbitrary, string, for example, a medium access control burned-in address assigned by a manufacturer to a wireless device according to the MAC-48, EUI-48, and EUI-64 standards. In some embodiments, the persistent name may be a public key of an asymmetric encryption key pair (e.g., one of the examples described above) assigned to a wireless device by a network authority or generated based on a known unique identifier, like a MAC address concatenated with a password. Or in some embodiments, a persistent name may be a combination of these different types of names in a single name.

In some embodiments, a computing device may select a new base station (or have a new base station selected) for handoff to that new base station, for example, in accordance with the techniques described above, like when a computing device moves into a geographic zone within wireless broadcast range of a new base station and upon leaving the broadcast range of an old base station. Upon selecting a new base station, some embodiments may register a given computing device with that new base station. In some embodiments, registering may include causing the new base station to update a routing table, a medium access control table, or the like, with the persistent name of the computing device in memory of the respective base station. In some embodiments, the base station handing off a given wireless device may inform the new base station of the persistent identifier, the wireless device itself may inform the new base station of the persistent identifier, or both.

In some embodiments, a wireless device may authenticate itself to a new base station as being entitled to use the persistent name with a cryptographic signature. The cryptographic signature may be signed with a private encryption key associated with a public encryption key available to the new base station as being authoritatively associated with the persistent name. In some embodiments, upon the new base station determining that the cryptographic signature is flawed, for example, was not signed by an entity with access to the corresponding private key, the update attempt may be rejected. Alternatively, upon the signature being validated, some embodiments may register the persistent name in memory of the base station.

In some embodiments, registration may include creating a record in a table of the new base station that associates the persistent name of the wireless computing device with a wireless channel access configuration by which the new base station communicates with the wireless device. Examples of configuration parameters include a time slot in a time division multiple access protocol, a code in a code division multiple access protocol, a frequency in a frequency division multiple access protocol, or a combination thereof in more advanced protocols that combine these techniques. When communications are received that are addressed to the wireless computing device having the persistent name, the new base station may access this table to identify parameters with which to configure a broadcast of the new information to the wireless computing device in accordance with the wireless channel access configuration.

In some embodiments, different Internet Protocol addresses, port numbers, or channel access configurations may be associated with a given wireless computing device at different times at different base stations as the wireless computing device moves through an area is and is handed off to different base stations.

In some embodiments, upon registering the persistent name with the new base station, in some embodiments, a record may be created by which other base stations or other network nodes may select routes to the wireless computing device through the network by specifying the persistent name. Examples include various centralized or distributed lookup data structures, like the above-describe distributed hash tables, which may map a persistent name to an Internet protocol address, port number, and channel access configuration of the new base station and wireless device. Other examples include implementations built on a hierarchical domain name service, records in distributed nodes implementing the Interplanetary File System Protocol, or records added to the namecoin block chain distributed ledger, mapping layer 2, 3, and 4 addresses (or subsets thereof) to the persistent name.

In some embodiments, there may be delays while distributed lookup records are updated upon a handoff, and these delays may cause a message addressed to the wireless computing device shortly after handoff to be routed to the former base station rather than a new base station to which a handoff has been executed. To mitigate the risk of lost messages, in some embodiments, the handing off base station may update its record associated with the persistent name to include a pointer to the new base station to which handoff was executed, for example upon receiving an acknowledgment from the new base station the handoff is complete, the acknowledgment including parameters by which the wireless computing device may be reached via the new base station. Upon receiving a packet for the wireless device at the old base station with stale routing, the old base station may forward the packet to the new base station based on these pointers. In some cases, this forwarding operation may occur over multiple hops. In some embodiments, these records may be expired after a threshold amount of time, or upon querying a distributed lookup system and determining that the distributed lookup system has been updated to reflect the handoff.

In some embodiments, the operation persistent name resolution may span various layers of a networking stack. For example, application layer exchanges may reference the wireless computing device with the persistent name, transport layer exchanges may reference the wireless computing device with the persistent name, networking layer exchanges may reference the wireless computing device with the persistent name, or data link layer exchanges may reference the wireless computing device with the persistent name. In some cases, these references may be made in headers, for example, in source or address fields of headers of packets or frames sent by or to the wireless computing device bearing a given persistent name. In some cases, a receiving network node, like a base station, router, or switch, may parse a persistent name from a header or application-layer payload, access the above-described lookup data structures to resolve the name to network address, and in some cases, a port number and channel access configuration, and route the message based on the result of the name resolution operations.

Figure 3:
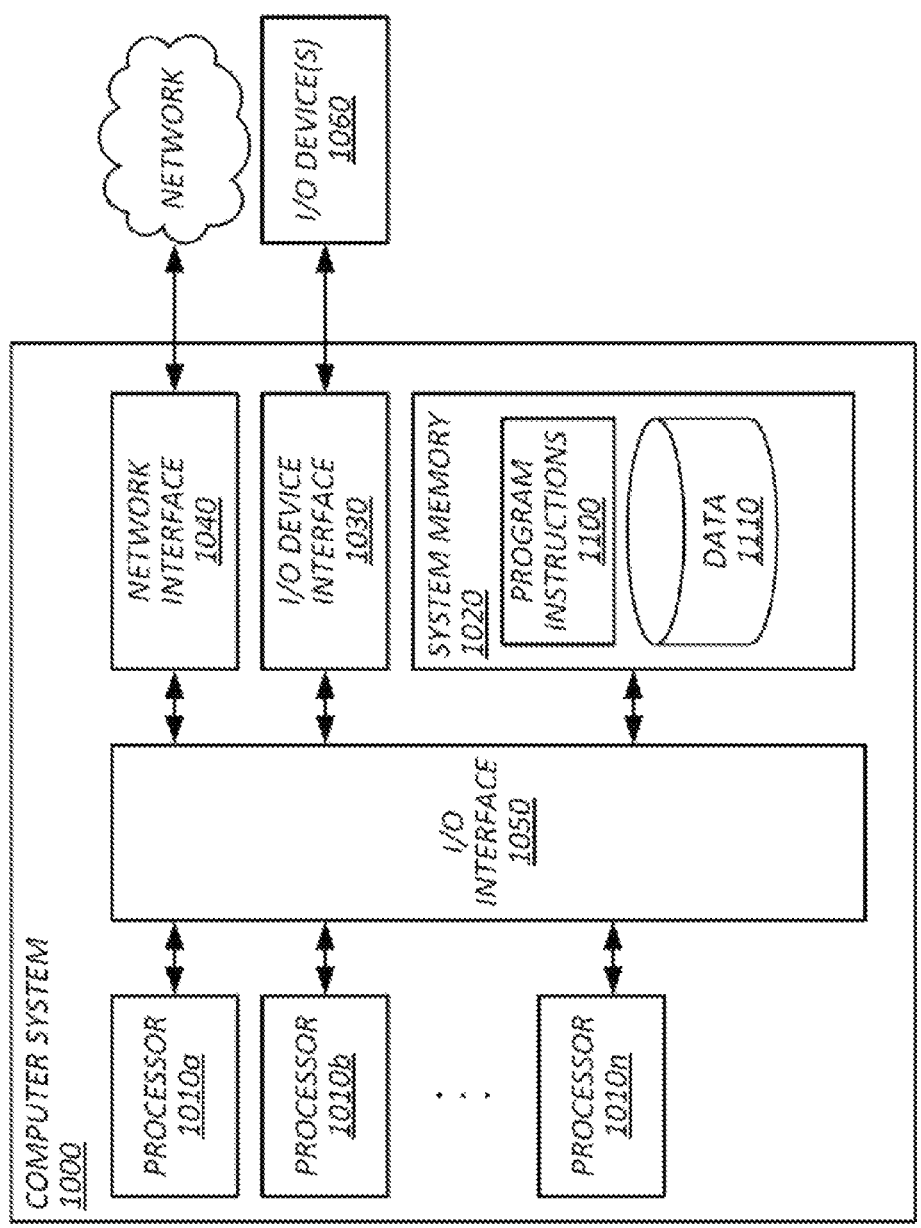
FIG. 3 is an example of a computing environment in which the present techniques may be implemented.

FIG. 3 is a diagram that illustrates an exemplary computing system 1000 in accordance with embodiments of the present technique. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010a-1010n) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a unit-processor system including one processor (e.g., processor 1010a), or a multi-processor system including any number of suitable processors (e.g., 1010a-1010n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010*a*-1010*n*) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010*a*-1010*n*) to cause the subject matter and the functional operations described herein. A memory (e.g., system memory 1020) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times, e.g., a copy may be created by writing program code to a first-in-first-out buffer in a network interface, where some of the instructions are pushed out of the buffer before other portions of the instructions are written to the buffer, with all of the instructions residing in memory on the buffer, just not all at the same time.

I/O interface 1050 may be configured to coordinate I/O traffic between processors 1010*a*-1010*n*, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010*a*-1010*n*). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present invention may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may provided by sending instructions to retrieve that information from a content delivery network.

The reader should appreciate that the present application describes several inventions. Rather than separating those inventions into multiple isolated patent applications, applicants have grouped these inventions into a single document because their related subject matter lends itself to economies in the application process. But the distinct advantages and aspects of such inventions should not be conflated. In some cases, embodiments address all of the deficiencies noted herein, but it should be understood that the inventions are independently useful, and some embodiments address only a subset of such problems or offer other, unmentioned benefits that will be apparent to those of skill in the art reviewing the present disclosure. Due to costs constraints, some inventions disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such inventions or all aspects of such inventions.

It should be understood that the description and the drawings are not intended to limit the invention to the particular form disclosed, but to the contrary, the intention is to cover all modifications, equivalents, and alternatives falling within the spirit and scope of the present invention as defined by the appended claims. Further modifications and alternative embodiments of various aspects of the invention will be apparent to those skilled in the art in view of this description. Accordingly, this description and the drawings are to be construed as illustrative only and are for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device.

In this patent, certain U.S. patents, U.S. patent applications, or other materials (e.g., articles) have been incorporated by reference. The text of such U.S. patents, U.S. patent applications, and other materials is, however, only incorporated by reference to the extent that no conflict exists between such material and the statements and drawings set forth herein. In the event of such conflict, the text of the present document governs.

The present techniques will be better understood with reference to the following enumerated embodiments:
1. A tangible, non-transitory, machine-readable medium storing instructions that when executed by one or more processors effectuate operations comprising: obtaining, with one or more processors, a distributed-application address of a distributed handoff application, wherein: the distributed-application address is a cryptographic hash value that uniquely identifies the distributed handoff application among a plurality of distributed applications executable on peer nodes of a peer-to-peer network of computing devices; the distributed handoff application is accessible via one or more of the peer nodes identified by entries in a distributed hash table linked, directly or indirectly, via the distributed hash table, to a key value in the distributed hash table corresponding to the distributed-application address; the distributed handoff application executes on one or more peer nodes of the peer-to-peer network of computing devices; and the distributed handoff application comprises a distributed-handoff application program interface (API) by which handoff from one wireless base station to another wireless base station is coordinated at least in part by at least some of the peer nodes of the peer-to-peer network; calling, with one or more processors, the distributed-handoff API with a request to handoff a current wireless data session between a first base station and a mobile computing device to another base station, wherein: the request causes the distributed handoff application to determine one or more parameters of the wireless data session from the first base station to a second base station, such that, after the handoff, the mobile computing device continues the wireless data session with the second base station; the determination causes the one or more parameters of the handoff of the wireless data session to be sent to both the mobile computing device and the second base station; and the determination causes a record of the second base station receiving the handoff to be stored in a tamper-evident, distributed ledger encoding records of a plurality of previous handoffs in a directed acyclic graph of cryptographic hash pointers; and receiving, with one or more processors, a result of the distributed-handoff API request and, in response, at least partially effectuating the handoff of the wireless data session from the first base station to the second base station.

2. The medium of embodiment 1, wherein: the mobile-computing device is a level 3 or higher self-driving automobile; the first base station is a cellular base station of a first cellular network operated by a first entity; and the second base station is a cellular base station of a second cellular network operated by a second entity different from the first entity.

3. The medium of any one of embodiments 1-2, wherein: the peer-to-peer network of computing devices is an ad hoc peer-to-peer network of untrusted computing devices; each peer on the peer-to-peer network is identified by a global unique identifier based on a respective public key of an asymmetric encryption protocol; at least some communication between peers on the peer-to-peer network is authenticated by peers cryptographically signing at least part of respective communications with a private cryptographic key corresponding to the public cryptographic key; and the distributed hash table encodes at least part of a peer routing table by which the distributed handoff application is accessed.

4. The medium of any one of embodiments 1-3, wherein: the handoff includes updating a routing table by which a network or transport layer address is persistently mapped to the mobile computing device across changes in the links in a physical layer arising from the handoff.

5. The medium of any one of embodiments 1-4, wherein: a previously assigned public Internet Protocol address of the mobile computing device persists across the handoff, such that the mobile computing device is reachable via the same public Internet Protocol address before and after the handoff.

6. The medium of any one of embodiments 1-5, the operations comprising: selecting a plurality of candidate base stations including the second base station, wherein: the distributed-handoff API requests identifies the plurality of candidate base stations; and the distributed handoff application is configured to emit an event indicative of the request that contains parameters of the handoff request received by one or more controllers of the plurality of candidate base stations; in response to receiving the parameters, at least some of the one or more controllers send another distributed-handoff API request to the distributed handoff application indicating respective capabilities and conditions; the distributed handoff application selects the second base station based on a comparison of respective capabilities and conditions from different candidate base stations.

7. The medium of embodiment 5, wherein: the operations comprise obtaining a geolocation of the mobile computing device determined by a location sensor of the mobile computing device; the geolocation of the mobile computing device is determined by the location sensor of the mobile computing device based on wireless beacons received from a plurality of satellites; the plurality of candidate base stations are selected based on the obtained geolocation; a previously assigned public Internet Protocol address of the mobile computing device persists across the handoff, such that the mobile computing device is reachable via the same public Internet Protocol address before and after the handoff; the public Internet Protocol address is associated with the first base station by a distributed hash table before the handoff; and the public Internet Protocol address is associated with the second base station by a distributed hash table after the handoff 8. The medium of any one of embodiments 1-7, wherein: the distributed-handoff API request specifies a route of the mobile computing device; and the distributed-handoff API is configured to select the second base station from among a plurality of candidate base stations based on the route and respective coverage areas of the plurality of base stations.

9. The medium of any one of embodiments 1-8, wherein: the distributed-handoff API request specifies a velocity of the mobile computing device; and the distributed-handoff API is configured to select the second base station from among a plurality of candidate base stations based on the velocity and respective coverage areas of the plurality of base stations.

10. The medium of any one of embodiments 1-9, the operations comprising: assigning a computing load of the mobile computing device to a network-edge-located data center co-located with the second base station or a baseband controller of the second base station.

11. The medium of embodiment 10, the operations comprising: transferring program state of the computing load of the mobile computing device from a network-edge-located data center co-located with the first base station or a baseband controller of the first base station to the network-edge-located data center co-located with the second base station or the baseband controller of the second base station.

12. The medium of any one of embodiments 1-11, the operations comprising: transferring program state for a dynamic federated cluster that moves with the mobile computing device onto different edge-based data centers associated with base stations designated to communicate with the mobile computing device, wherein: the program state is based on data from a plurality of sensors of the mobile computing device streamed to the dynamic federated cluster, at least in part, via the first base station.

13. The medium of embodiment 12, wherein: the dynamic federated cluster executes a machine learning algorithm by which objects are detected in images or Light Detection and Ranging readings.

14. The medium of any one of embodiments 1-13, wherein: the distributed-handoff API request is sent by the mobile computing device.

15. The medium of any one of embodiments 1-13, wherein: the distributed-handoff API request is initiated and sent by the first base station.

16. The medium of any one of embodiments 1-13, wherein: the distributed-handoff API request is initiated and sent by a baseband controller that manages a plurality of base stations.

17. The medium of any one of embodiments 1-16, the operations comprising: executing the distributed handoff application and, thereby, determining the one or more parameters of the handoff and storing the record in the tamper-evident, distributed ledger.

18. The medium of any one of embodiments 1-17, the operations comprising: conveying at least some data in the wireless data session while providing cellular network access to the mobile computing device.

19. The medium of any one of embodiments 1-18, the operations comprising: registering a persistent name of the mobile computing device with the other base station responsive to establishing a data-link layer wireless connection with the base station, wherein the persistent name follows the mobile computing device across base stations while other addresses by which messages are routed to the mobile computing device change across base stations.

20. The medium of embodiment 19, wherein registering comprises: updating a record in memory of the other base station with a record that associates the persistent name with a wireless channel access configuration assigned to the mobile computing device; and updating records in means for performing a distributed name lookup.

21. The medium of embodiment 19, wherein registering comprises: designating the mobile computing device as having severed connection with the first base station in a routing table of the first base station; and adding a pointer to the second base station to a record in memory of the first base station that associates the pointer with the persistent name.

22. A method, comprising: the operations of any one of embodiments 1-21.

23. A system, comprising: one or more processors; and memory storing instructions that when executed by the processors cause the processors to effectuate operations comprising: the operations of any one of embodiments 1-21.

What is claimed is:

1. A tangible, non-transitory, machine-readable medium storing instructions that when executed by one or more processors effectuate operations comprising:
    obtaining, with one or more processors, a distributed-application address of a distributed handoff application, wherein:
        the distributed-application address is a cryptographic hash value that uniquely identifies the distributed handoff application among a plurality of distributed applications executable on peer nodes of a peer-to-peer network of computing devices;
        the distributed handoff application is accessible via one or more of the peer nodes identified by entries in a distributed hash table linked, directly or indirectly, via the distributed hash table, to a key value in the distributed hash table corresponding to the distributed-application address;
        the distributed handoff application executes on one or more peer nodes of the peer-to-peer network of computing devices; and
        the distributed handoff application comprises a distributed-handoff application program interface (API) by which handoff from one wireless base station to another wireless base station is coordinated at least in part by at least some of the peer nodes of the peer-to-peer network;
    calling, with one or more processors, the distributed-handoff API with a request to handoff a current wireless data session between a first base station and a mobile computing device to another base station, wherein:
        the request causes the distributed handoff application to determine one or more parameters of a handoff of the wireless data session from the first base station to a second base station, such that, after the handoff, the mobile computing device continues the wireless data session with the second base station;
        the determination causes the one or more parameters of the handoff of the wireless data session to be sent to both the mobile computing device and the second base station; and
        the determination causes a record of the second base station receiving the handoff to be stored in a tamper-evident, distributed ledger encoding records of a plurality of previous handoffs in a directed acyclic graph of cryptographic hash pointers; and
    receiving, with one or more processors, a result of the distributed-handoff API request and, in response, at least partially effectuating the handoff of the wireless data session from the first base station to the second base station.

2. The medium of claim 1, wherein:
the mobile-computing device is a level 3 or higher self-driving automobile;
the first base station is a cellular base station of a first cellular network operated by a first entity; and
the second base station is a cellular base station of a second cellular network operated by a second entity different from the first entity.

3. The medium of claim 1, wherein:
the peer-to-peer network of computing devices is an ad hoc peer-to-peer network of untrusted computing devices;
each peer on the peer-to-peer network is identified by a global unique identifier based on a respective public key of an asymmetric encryption protocol;
at least some communication between peers on the peer-to-peer network is authenticated by peers cryptographically signing at least part of respective communications with a private cryptographic key corresponding to the public cryptographic key; and
the distributed hash table encodes at least part of a peer routing table by which the distributed handoff application is accessed.

4. The medium of claim 1, wherein:
the handoff includes updating a routing table by which a network or transport layer address is persistently mapped to the mobile computing device across changes in the links in a physical layer arising from the handoff.

5. The medium of claim 1, wherein:
a previously assigned public Internet Protocol address of the mobile computing device persists across the handoff, such that the mobile computing device is reachable via the same public Internet Protocol address before and after the handoff.

6. The medium of claim 1, the operations comprising:
selecting a plurality of candidate base stations including the second base station, wherein:
the distributed-handoff API requests identifies the plurality of candidate base stations; and
the distributed handoff application is configured to emit an event indicative of the request that contains parameters of the handoff request received by one or more controllers of the plurality of candidate base stations;
in response to receiving the parameters, at least some of the one or more controllers send another distributed-handoff API request to the distributed handoff application indicating respective capabilities and conditions;
the distributed handoff application selects the second base station based on a comparison of respective capabilities and conditions from different candidate base stations.

7. The medium of claim 5, wherein:
the operations comprise obtaining a geolocation of the mobile computing device determined by a location sensor of the mobile computing device;
the geolocation of the mobile computing device is determined by the location sensor of the mobile computing device based on wireless beacons received from a plurality of satellites;
the plurality of candidate base stations are selected based on the obtained geolocation;
a previously assigned public Internet Protocol address of the mobile computing device persists across the handoff, such that the mobile computing device is reachable via the same public Internet Protocol address before and after the handoff;
the public Internet Protocol address is associated with the first base station by a distributed hash table before the handoff; and
the public Internet Protocol address is associated with the second base station by a distributed hash table after the handoff.

8. The medium of claim 1, wherein:
the distributed-handoff API request specifies a route of the mobile computing device; and
the distributed-handoff API is configured to select the second base station from among a plurality of candidate base stations based on the route and respective coverage areas of the plurality of base stations.

9. The medium of claim 1, wherein:
the distributed-handoff API request specifies a velocity of the mobile computing device; and
the distributed-handoff API is configured to select the second base station from among a plurality of candidate base stations based on the velocity and respective coverage areas of the plurality of base stations.

10. The medium of claim 1, the operations comprising:
assigning a computing load of the mobile computing device to a network-edge-located data center co-located with the second base station or a baseband controller of the second base station.

11. The medium of claim 10, the operations comprising:
transferring program state of the computing load of the mobile computing device from a network-edge-located data center co-located with the first base station or a baseband controller of the first base station to the network-edge-located data center co-located with the second base station or the baseband controller of the second base station.

12. The medium of claim 1, the operations comprising:
transferring program state for a dynamic federated cluster that moves with the mobile computing device onto different edge-based data centers associated with base stations designated to communicate with the mobile computing device, wherein:
the program state is based on data from a plurality of sensors of the mobile computing device streamed to the dynamic federated cluster, at least in part, via the first base station.

13. The medium of claim 12, wherein:
the dynamic federated cluster executes a machine learning algorithm by which objects are detected in images or Light Detection and Ranging readings.

14. The medium of claim 1, wherein:
the distributed-handoff API request is sent by the mobile computing device.

15. The medium of claim 1, wherein:
the distributed-handoff API request is initiated and sent by the first base station.

16. The medium of claim 1, wherein:
the distributed-handoff API request is initiated and sent by a baseband controller that manages a plurality of base stations.

17. The medium of claim 1, the operations comprising:
steps for handing off a wireless data session between base stations; and
steps for storing data in a tamper-evident, distributed ledger.

18. The medium of claim 1, the operations comprising:
executing the distributed handoff application and, thereby, determining the one or more parameters of the handoff and storing the record in the tamper-evident, distributed ledger.

19. The medium of claim 1, the operations comprising:
conveying at least some data in the wireless data session while providing cellular network access to the mobile computing device.

20. The medium of claim 1, the operations comprising:
registering a persistent name of the mobile computing device with the other base station responsive to establishing a data-link layer wireless connection with the base station, wherein the persistent name follows the mobile computing device across base stations while other addresses by which messages are routed to the mobile computing device change across base stations.

21. The medium of claim 20, wherein registering comprises:
updating a record in memory of the other base station with a record that associates the persistent name with a wireless channel access configuration assigned to the mobile computing device; and
updating records in means for performing a distributed name lookup.

22. The medium of claim 20, wherein registering comprises:
designating the mobile computing device as having severed connection with the first base station in a routing table of the first base station; and adding a pointer to the second base station to a record in memory of the first base station that associates the pointer with the persistent name.

23. A method, comprising:

obtaining, with one or more processors, a distributed-application address of a distributed handoff application, wherein:

the distributed-application address is a cryptographic hash value that uniquely identifies the distributed handoff application among a plurality of distributed applications executable on peer nodes of a peer-to-peer network of computing devices;

the distributed handoff application is accessible via one or more of the peer nodes identified by entries in a distributed hash table linked, directly or indirectly, via the distributed hash table, to a key value in the distributed hash table corresponding to the distributed-application address;

the distributed handoff application executes on one or more peer nodes of the peer-to-peer network of computing devices; and the distributed handoff application comprises a distributed-handoff application program interface (API) by which handoff from one wireless base station to another wireless base station is coordinated at least in part by at least some of the peer nodes of the peer-to-peer network;

calling, with one or more processors, the distributed-handoff API with a request to handoff a current wireless data session between a first base station and a mobile computing device to another base station, wherein:

the request causes the distributed handoff application to determine one or more parameters of a handoff of the wireless data session from the first base station to a second base station, such that, after the handoff, the mobile computing device continues the wireless data session with the second base station;

the determination causes the one or more parameters of the handoff of the wireless data session to be sent to both the mobile computing device and the second base station; and the determination causes a record of the second base station receiving the handoff to be stored in a tamper-evident, distributed ledger encoding records of a plurality of previous handoffs in a directed acyclic graph of cryptographic hash pointers; and receiving, with one or more processors, a result of the distributed-handoff API request and, in response, at least partially effectuating the handoff of the wireless data session from the first base station to the second base station.

* * * * *